FERROELECTRIC MEMORY SYSTEMS

Filed June 5, 1958 3 Sheets-Sheet 1

INVENTOR.
GEORGE R. BRIGGS
BY Morris A. Rabkin
ATTORNEY

FERROELECTRIC MEMORY SYSTEMS

Filed June 5, 1958 3 Sheets-Sheet 2

INVENTOR.
GEORGE R. BRIGGS
BY [signature]
ATTORNEY

INVENTOR.
GEORGE R. BRIGGS
BY Morris A. Rabin
ATTORNEY

United States Patent Office 3,046,529
Patented July 24, 1962

3,046,529
FERROELECTRIC MEMORY SYSTEMS

George R. Briggs, Princeton, N.J., assignor to Radio Corporation of America, a corporation of Delaware Filed June 5, 1958, Ser. No. 740,116
18 Claims. (Cl. 340—173.2)

This invention relates to memory systems, and particularly to memory systems of the ferroelectric type.

Ferroelectric memories are known which employ a sheet of ferroelectric material for storing a plurality of binary digits "1" and "0." A set of row conductors is placed on one side of the sheet and a set of column conductors is placed at right angles to the row conductors on the other side of the sheet. The volume of material between any one row and any one column conductor represents a storage element capable of storing a binary digit. The two remanent states of the elements correspond respectively to the two conditions "1" and "0" of a binary digit.

Information is written into a desired element by applying voltage pulses to the row and column conductors of that element. Each of these voltage pulses is of insufficient amplitude to change any other elements of the selected row and column. The the two voltages together are sufficient in amplitude to change the selected element to a given one of the two remanent states.

It is desirable, in these prior ferroelectric memories, to increase the ease of reading the information stored in a selected one of the elements. Presently, in most systems of this kind, only two terminals are available to obtain access to the selected element. In certain prior ferroelectric memories, a common impedance element is connected to one of the array conductors to obtain the read-out signals from the selected element. However, each of the partially selected elements also contribute to the current flow in the common impedance elment in a direction to cause spurious read signals. Therefore, the discrimination ratio between a binary "1" and a binary "0" output is relatively low, particularly when the material does not exhibit an ideal rectangular loop.

It is an object of the present invention to provide improved ferrolectric memory systems.

Another object of the present invention is to provide improved construction and operation of ferroelectric memory systems.

Still another object of the present invention is to provide novel means for reading information stored in a ferroelectric memory.

According to the present invention, a sheet of ferroelectric (FE) material is used for storing binary information signals. A set of conductors is placed on one surface of the sheet. A sheet of electroluminescent material (EL) has one of its surfaces placed against the other surface of the FE sheet. On the other surface of the EL sheet is arranged another set of conductors of transparent conductive material, but transverse to the first set of conductors. The material separating each different pair of transverse conductors defines a separate FE–EL cell combination. During operation, a selected FE cell, in changing between its remanent states, applies an electric field across the EL cell of the combination. The EL cell then emits a burst of light. A suitable light responsive device may be used to detect the light burst indicating the storage of one of a pair of binary digits. When the FE cell does not change its remanent state during the read operation relatively little electric field intensity is produced and the EL cell does not emit any appreciable light output, indicating the storage of the other binary digit.

A feature of this invention includes the addition of a light conductinrg layer for conducting the light pulse emitted by one or more of a plurality of EL cells to a common light responsive device.

Another feature of the invention resides in the provision of a novel method of driving the FE array to reduce information loss.

Figure 1:
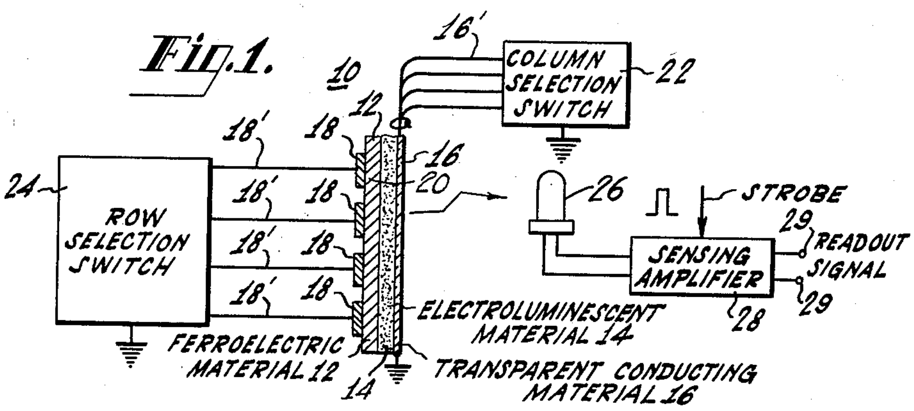
FIG. 1 is a schematic diagram of a ferroelectric memory system according to the invention.
Figure 2:
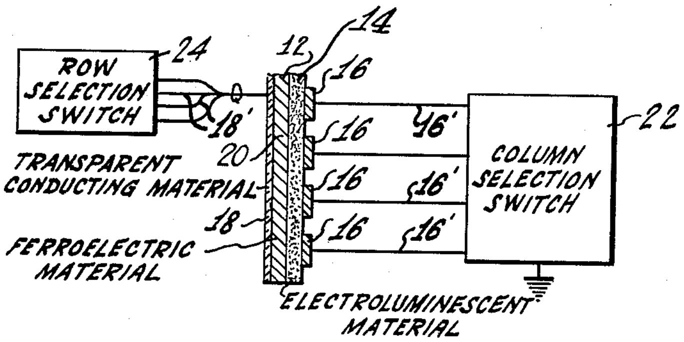
FIG. 2 is a top view, partly schematic, of the memory system of FIG. 1.

Referring now to FIGS. 1 and 2, there is shown a memory system having a storage array 12 of FE cells. The array 12 may be made of a single sheet of polycrystalline FE material. Alternatively, the FE array 12 may be formed by a plurality of separate FE crystals arranged in a regular geometric matrix with the separate crystals being secured by any suitable binder such as plastic or glass frit. In case of a polycrystalline FE sheet, the surfaces of the sheet may be provided with grooves to reduce any interaction between adjacent storage cells. A suitable FE material is one having a substantially rectangular hysteresis loop such as barium-titanate, guanidine-aluminum-sulphate-hexahydrate (GASH), triglycine-sulphate (TGS), or a lead zirconate activated by a slight amount of titanium (PTZ). A layer of EL material in the form of a sheet 14 is placed in contact with one surface of the FE storage array 12. A suitable EL material is zinc-sulphide powder with a copper activator. The EL sheet 14 may be in the form of powdered EL material in a glass or plastic binder. The EL sheet also may be provided with grooves to reduce dispersion of current flowing in the EL sheet as a result of selecting a FE element, as described more fully hereinafter. If desired, the sheet 14 of EL material may be evaporated directly on the surface of the FE storage array 12. Other ways of forming the EL material may be used. For example, the EL material may be sprayed, painted, or settled from solution, on the surface of the FE storage array 12.

The EL sheet 14 has a set of column conductors 16 placed on its other surface. The column conductors 16 are made of transparent conducting material such as tin oxide. A suitable method of placing the column conductors 16 on the EL sheet 14 is by evaporating the tin oxide over the entire surface of the EL sheet 14, and then etching away portions of the tin oxide to provide the separate column conductors 16. A set of row conductors 18 is placed on the other surface of the FE storage array 12.

Figure 3:
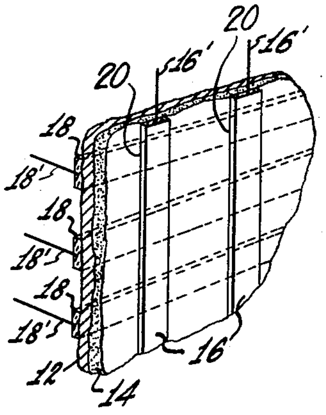
FIG. 3 is a partial three dimensional view of a portion of the memory system of FIG. 1 illustrating the structural arrangement of the various elements.

The fragmentary view of FIG. 3 shows the construction of the storage array of FIG. 1 in more detail. Each of the FE storage elements 20 of FIG. 3 is defined by the volume of FE material between a different column conductor 16 and a different row conductor 18. The column and row conductors 16' and 18' may be soldered to the plated array column and row conductors 16 and 18 for connection to external selection pulse sources. The amount of FE material is matched with the amount of EL material so that the change of charge produced by the FE material in changing from remanence to saturation in the same state does not charge the EL material above a given threshold voltage at which the EL material emits appreciable radiation. Using a PTZ material one milli-inch thick, a ratio of about 200 between the area of the EL material and the FE material of any FE-EL cell combination is suitable. The desired ratio can be obtained by varying the widths of the sets of column and row conductors 16 and 18, by the grooving of the EL material, and so on.

In FIG. 1 the column conductors 16' are all connected to a column selection switch 22 and the row conductors 18' are all connected to a row selection switch 24. The column and row selection switches 22 and 24 may be any suitable means for applying voltage pulses to a selected column conductor 16' and a selected row conductor 18'. For example, the selecting switches may be gas tube type switches arranged to apply positive and negative polarity voltage pulses to a selected one of the column and row conductors 16' and 18'. Each of the column and row conductors 16' and 18' has a D.C. (direct current) connection to a common reference potential indicated by the conventional ground symbol.

A light responsive device, such as a photomultiplier tube 26, is placed in proximity to the EL sheet 14. The tube 26 responds to light pulses emitted by the EL sheet 14. In the case of zinc sulphide EL material, a light pulse having a wavelength in the yellow or blue portion of the spectrum is emitted. In such case, a suitable photomultiplier tube is a type 6328 which has its photocathode located axially along the tube. Other light rsponsive devices such as phototransistors, photodiodes, etc. may be used, if desired.

The output of the photomultiplier 26 is connected to a sensing amplifier 28. The sensing amplifier 28 may have another input for receiving a strobe signal used during the read portion of the memory operation.

Figure 4:
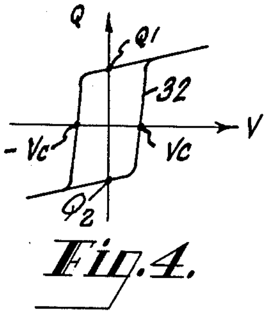
FIG. 4 is a hysteresis loop, somewhat idealized, for any one of the ferroelectric elements of FIG. 1.

The curve 32 of FIG. 4 is a graph, somewhat idealized, of the hysteresis characteristic exhibited by a suitable FE element 20. The FE element 20 may be polarized in either one of the two remanent states, represented by the points Q1 and Q2 of the curve 32, by an applied field (V) of suitable amplitude and polarity. A positive polarity applied field in excess of a coercive value V*c* changes the element along the right branch of the curve 32 to saturation in the positive direction. After the applied field is removed, the element returns to its remanent positive polarized condition represented by the point Q1. A negative polarity applied field in excess of a coercive field—V*c* changes the element along the left branch of the curve 32 to saturation in the negative direction. Upon removal of the applied field—V*c* the element returns to the remanent polarized condition represented by the point Q2. In changing from remanence in one direction, positive or negative, to saturation in the same direction, relative little charge is changed in the element 20 and relatively little current flow is produced around a closed current path connected across the element. In changing between the two remanent conditions, a relative large change of charge is produced in the element, and a relatively large current flows in the closed current path.

Figure 5:
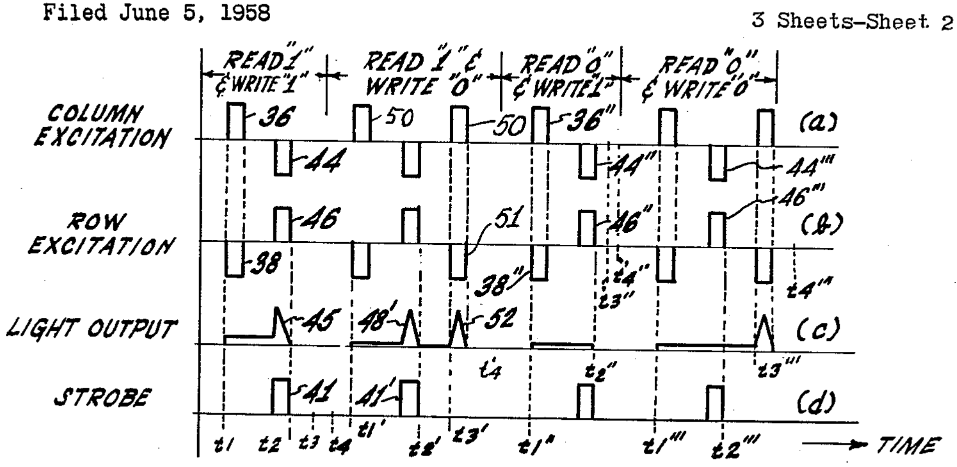
FIGS. 5, 6, 7 are timing diagrams each illustrating a different method of operating the memory systems of the invention.

One schedule of operating the memory system of FIG. 1 is shown in the timing diagram of FIG. 5. By way of example, four different cycles of operation are illustrated in FIG. 5. Each memory cycle has a read portion and a write portion. The read portion occurs between the times *t*1 and *t*2 and the write portion occurs between the later times *t*3 and *t*4. During the read portion of the memory cycle, the information stored in a desired one of the FE elements 20 (FIGS. 1 and 2) is determined by applying a pair of opposite polarity voltage pulses comprising a first positive and a second negative pulse to the column conductor 16 of the desired element. A pair of opposite polarity voltage pulses, comprising a first negative and a second positive pulse, is applied at the same time to the row conductor 18 of the desired element. Each of these voltage pulses produces an applied field across the selected element less than the coercive field of the element. However, the two first applied voltage pulses together produce an applied field in excess of the coercive field of the selected FE element 20, as do the two second applied voltage pulses.

Assume for the moment that the selected element 20 is polarized in the negative remanent state Q2 of FIG. 4. A positive column pulse and a negative row pulse together apply a field sufficient to change the FE element 20 from the initial remanent state Q2 to saturation in the positive state. Due to the relatively large change of charge in the selected element 20, a relatively large current flow is produced. This current flow is from the common ground through the column switch 22, and the selected column conductors 16' and 16, through the EL sheet 14, through the selected FE element 20, and through the selected row conductors 18' and 18, and then the row selection switch 24 back to the common ground. Each of the other column conductors 16' and 18' are opencircuited at this time. The column and row voltage excitations are indicated by the pulses 36 and 38 of lines *a* and *b* of FIG. 5.

Initially, the current flow charges the EL sheet 14. Note that during the charging interval, the EL sheet 14 produces only a relatively small light output. This initial charging produces a voltage across the EL layer 14 which is in the nature of priming or enabling voltage with respect to light output. However, when the second set of column and row pulses are applied, the FE element changes back to the initial negative state producing another relatively large current flow in the opposite direction to discharge the EL material 14. The second column and row read pulses are represented in FIG. 5 by the negative pulse 44 of line *a* and the positive pulse 46 of line *b*, respectively. At this time, the primed EL sheet 14 emits a relatively large amplitude light pulse. The light output of the EL sheet 14 is represented by the positive spike of the light pulse 45 of line *c* of FIG. 5. The light pulse 45 is detected and amplified by the photomultiplier 26 of FIG. 1. The photomultiplier 26 applies a relatively large output signal to the sensing amplifier 28. A positive strobe pulse, indicated by the positive pulse 41 of line *d* of FIG. 5, is also applied during the presence of the light pulse 48 to the strobe input of the sensing amplifier 28. The coincidence of the light pulse 45 and the strobe pulse 41 activate the sensing amplifier 28 which then applies an output signal across the output terminals 29. Upon termination of the column and row read pulses, the selected FE cell returns to the initial remanent state represented by the point Q2 of FIG. 4. The EL material 14 also returns to its initial condition. No light output is produced by the EL material when it returns to its initial condition because the EL material is already substantially discharged.

Figure 8:
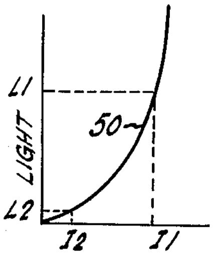
FIG. 8 is a graph showing the light output of an EL cell vs. applied electric field.

As shown in FIG. 8, the switching characteristic of the EL material is highly non-linear. The curve 50 of FIG. 8 is a plot of the light output of the EL material vs. current flow through the EL material. It is seen that a relatively large light output L1 is produced for a relatively large current flow I1. However, a relatively small light output L2 is produced for a smaller amplitude current I2. In practice, the smaller current I2 may be as much as 20 percent of the larger current I1, and the small light output L2 is only a fraction, say 1/3000, of the large light output L1. The small current flow, if any, corresponds to the current flow produced when a FE cell is changed between its remanent and saturated conditions in the same state. The large current flow is produced when a FE cell changes from one to the other of its two states. Accordingly, the non-linear EL material provides a relatively high discrimination, or "one-to-zero" ratio, between the two possible outputs of a FE element during the read operation. Observe that during the read operation, there are in effect no so-called disturb signals contributed by the EL cell elements associated with the partially selected FE cell elements of the selected row conductor 18 and the selected column conductor 16. The current flow for the partially selected elements is through the selected column conductor 16, then through the non-selected row conductor 18, and through the row switch 24 to the common ground. Note that the selected element is always in the same remanent state Q2 at the end of the read operation. The state Q2 may represent, for example, a binary "1" digit. Thus, if it is desired to write a binary "1" digit into the selected FE element 20, as shown for the first cycle of FIG. 5, no further pulses need be applied during the write portion of the cycle between the times *t*3 and *t*4.

The second memory cycle of FIG. 5 occurs between the times *t*1′ and *t*4′. Assume that it is desired to again read out the binary "1" digit stored in the same selected element 20, and to write a binary "0" digit into this element 20. The read portion of the memory cycle, between the times *t*1′ and *t*2′, is the same as that described above. However, during the write portion of the cycle between the times *t*3′ and *t*4′, a third, positive write pulse is applied to the selected column conductor 16 and a third negative write pulse is applied to the selected row conductor 18. The pair of write pulses are represented in FIG. 5 by the positive pulse 50 and the negative pulse 51 of lines *a* and *b*, respectively. The column and row write pulses 50 and 51 together apply a coercive field greater than the coercive field Vc across the selected element 20. Thus, the element 20 is changed to the opposite remanent state Q1, representing a binary "0" digit. The resultant current flow in the EL material 14 is opposite from that produced during the read operation. The EL material 14 emits another light pulse, shown as the positive pulse 52 of line *c*, which is detected by the photomultiplier 26. However, the strobe pulse 41′ is not applied to the sensing amplifier 28 during the write portion of the cycle, and thus no output signal appears across the output terminals 29.

The third memory cycle is shown in FIG. 5 to occur between the times *t*1″ and *t*4″. Assume that it is desired to read the binary "0" stored in the same selected element 20 and to write a binary "1" back into the selected element 20. The first column and row pulses 36″ and 38″ change the selected element 20 from remanence to saturation in the initial positive state. Thus, relatively little current flows through the EL material 14 and no light output is produced. The second column and row pulses 44″ and 46″ together change the selected element from the positive state to the negative state. A relatively large current flow is produced in the EL material 14 due to the large change of charge in the selected element 20. However, the EL material 14 does not emit any appreciable light output, due to the lack of any appreciable current flow when the first read pulses 36″ and 38″ were applied. The photomultiplier tube 26 (FIG. 1) therefore does not produce an output signal. Thus, no output signal is produced by the sensing amplifier 28 of a binary "0" by the selected FE element 20. At the termination of the read portion of the cycle, the selected element 20 is already in the negative remanent state Q2 representing the desired binary "1" digit. Thus, no pulses are applied during the latter write portion of the cycle.

The fourth cycle of FIG. 5 represents the reading of a binary "0" digit from a selected element 20 and the writing of a binary "0" digit. The fourth cycle is similar to the second cycle described above except no appreciable light output is produced during the read portion of the cycle. Also, the EL material 14 emits a light pulse during the write portion of the cycle due to the prior current flow in the EL material when the second read pulses 44‴ and 46‴ are applied.

Figures 6, 7:
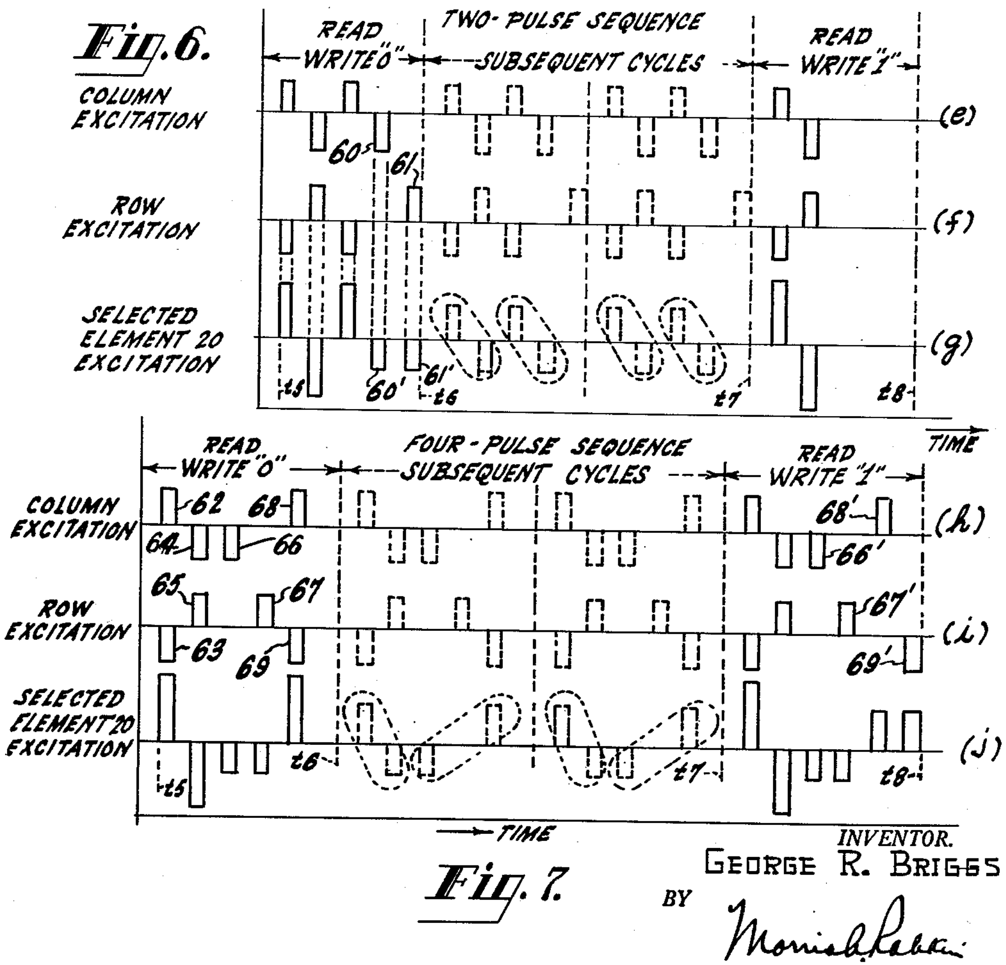

One problem with presently available FE materials is that a succession of partial selection signals tends to cause the storage element to change from one state to the opposite state. Thus, it is desirable to apply balanced partial excitations with the effect of each partial excitation of one polarity being effectively cancelled by a later partial excitation of the opposite polarity. The timing diagram of FIG. 6 shows one method of operating the memory system using symmetrical balanced excitation wherein each selecting pulse of one polarity is followed by an opposite polarity selecting pulse. During any one memory cycle, either two or four selecting pulses are applied to the column and row conductors 16 and 18 depending on whether it is desired to write a binary "0" or a binary "1" digit. The first three pulses applied to the selected column and row conductors 16 and 18 are used to read the information stored in the selected element 20 and to write a binary "0" digit in the same manner described for the timing diagram of FIG. 5. However, a negative polarity disturb pulse is applied to the column conductor 16 following each positive polarity write pulse, and a positive polarity disturb pulse is applied to the row conductor 18 following each negative polarity row write pulse. These two disturb pulses are indicated in FIG. 6 by the negative column pulse 60 of line *e* and the positive row pulse 61 of line *f*. The two disturb pulses are applied one after the other so that the coercive field of the selected element 20 is not exceeded. Observe that each partially selected element of the FE array receives two positive and two negative pulses during a read-write "0" memory cycle. Thus, the partially selected elements 20 are substantially in the same remanent condition before and after the memory cycle. The alternate polarity dotted pulses of lines *e* and *f* represent the balanced excitations applied to partially selected elements 20 during a sequence of memory cycles. During a read-write "1" operation, only the two opposite polarity pulses are applied coincidently to the selected column and row lines 16 and 18 and no further half-amplitude pulses are required for balancing.

Observe also that during a sequence of operations the selected element 20 receives two partial excitation pulses each tending to change the selected element 20 from the initial negative remanent state to the positive remanent state. These partial excitation pulses thus apply a net excitation to the selected element as indicated by the pulses 60′ and 61′ of line *g* of FIG. 6. The dotted pulses of line *g* correspond to excitations applied to the selected element itself when other elements aligned with the selected element 20, for example, elements 20 in the same column are selected during subsequent cycles. As indicated by the closed, dotted lines of line *g*, the partial excitations, except for the pulses 60′ and 61′, do not apply any net unbalanced excitation to the selected element.

The effect of these two disturb pulses on the selected element 20 can be compensated for by using the pulse schedule shown in FIG. 7. In FIG. 7, four excitation pulses are applied during every memory cycle. During a read-write "0" cycle, the first and second column pulses 62, 64 (line *h*) are coincident with the first and second row pulses 63, 65 (line *i*) to read the stored information. The third column and third row pulses 66 and 67 are staggered relative to each other to symmetrically disturb the FE elements. The fourth column and row pulses 68, 69 are coincident with each other to write the binary "0" digit. Thus, at the end of the cycle, the selected element 20 is in an undisturbed condition in the positive remanent state. The non-selected elements receive symmetrical partial excitations of a pair of pulses of one polarity followed by a pair of pulses of the opposite polarity, as indicated by the dotted pulses of lines *h* and *i* of FIG. 7. During a read-write "1" cycle, the fourth column and row pulses 68' and 69' are staggered relative to each other so that the selected element 20 remains in the negative remanent state. Note that the third and fourth column pulses 66' and 68' and the third and fourth row pulses 67' and 69' symmetrically disturb the selected element 20. Accordingly, the pulse schedule of FIG. 7 provides a means for compensating for the effects of partial excitation pulses on the non-selected and the selected ones of the FE elements 20. The pulses applied to the selected element 20 of an array using the balanced pulse schedule are shown in line *j* of FIG. 7. The dotted pulses of the subsequent cycles correspond to partial excitations applied to one of the pair of selecting lines of the selected element 20, for example, the column line when other elements 20 of the same row are selected. Observe that all the partial excitation pulses of one polarity are balanced by partial excitation pulses of the opposite polarity. Thus, the pulse schedule of FIG. 7 provides an improved means of operating the memory system in that there is no tendency for the undesired effects of the partial excitations to become cumulative.

Figure 9:
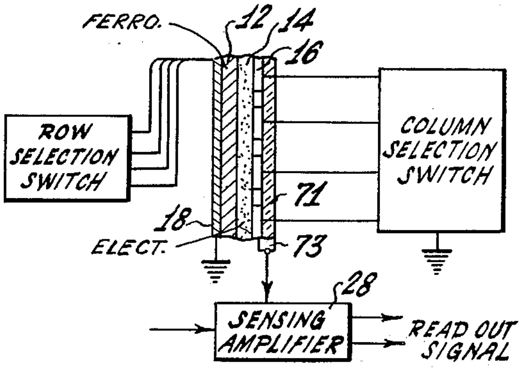
FIG. 9 is a schematic diagram of a memory system according to the invention using a light conducting material.

In the embodiment of the memory system of FIG. 9, a sheet 71 of light conducting material, such as Lucite, is placed against the transparent conducting material forming the column conductors 16. The front and back surfaces of the light conducting material 71 are polished so that the light pulse emitted by the EL layer 14 is trapped in the light conducting sheet 71 by internal reflection. After repeated internal reflections in the material 71, the light is transmitted through the bottom edge of the sheet 71 to a light responsive device 73 such as a phototube which is placed in optical contact with the bottom edge of the sheet 71. The top edge and sides of the light conducting sheet 71 may be coated with an opaque material to prevent light transmission therefrom. The output of the phototube 73 is applied to the sensing amplifier 28. The arrangement of the system of FIG. 9 is otherwise similar to the arrangement of the system of FIG. 1.

Figure 10:
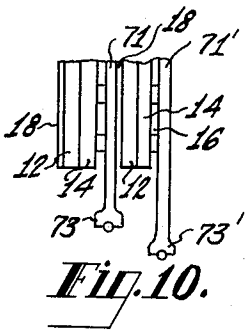
FIG. 10 is a schematic diagram of another embodiment of a ferroelectric memory system according to the invention using a light conducting element.

Because each of the FE, EL and light conducting sheets used in the system of FIG. 9 is a relatively thin panel, a plurality of these systems can be stacked together in various ways to form a compact memory system of relatively large capacity. The fragmentary view of FIG. 10 indicates one manner of stacking a pair of the memory systems according to FIG. 9 to form a larger memory system. The bottom edges of the light conducting sheets 71, 71' of FIG. 10 are staggered relatively to each other to permit close packing. The staggering is preferable because the widths of the light responsive devices 73, 73' may exceed the combined widths of the panels used in the memory arrays.

Figure 11:
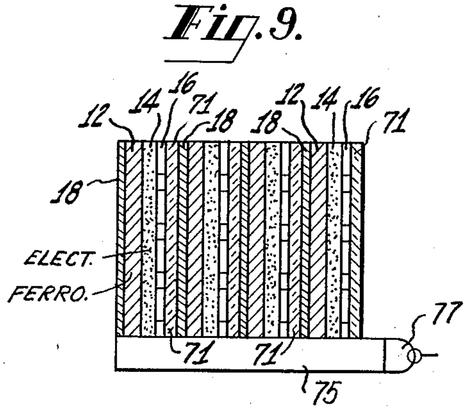
FIG. 11 is a fragmentary view of another embodiment of a ferroelectric memory system according to the invention using light conducting elements.
Figure 12:
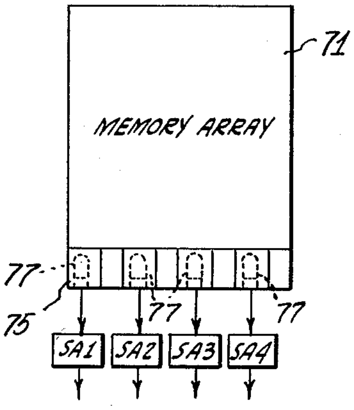
FIG. 12 is a schematic diagram of still another embodiment of a feroelectric memory system according to the invention using a different arrangement of light conducting elements.

Another manner of stacking a plurality of the memory systems according to FIG. 9 to form a larger memory system is shown in FIG. 11. In FIG. 11, a second light conducting element 75 is placed in optical contact with and perpendicular to the bottom edge of each of the light conducting sheets 71. As shown in the side view of FIG. 12, each separate first light conducting element 71 of the array is provided with a separate second light conducting element 75. A plurality of phototubes 77 are placed in optical contact with the back edge of each light conducting element 75. Thus, the signal provided by each of the separate memory arrays produces a separate signal in each of the photo-conductive tubes 77. The output signals of the photoconducting tubes 77 are applied to a plurality of sensing amplifiers, one for each of the arrays of the larger memory system. Thus, the information stored in each separate one of the memory arrays is read out at the same time to the sensing amplifiers SA1–SA4. This form of read-out of the memory system corresponds to a so-called parallel read-out, wherein a word comprising a pattern of binary digits "1" and "0" is read out of and written into the memory system at the same time.

There have been described herein improved memory systems using ferroelectric storage elements and electroluminescent elements. The elements are interconnectd so that the electroluminescent elements respond to the ferroelectric elements in accordance with the stored information. The electroluminescent material radiates either a relatively large or a relatively small signal depending upon whether the selected storage element is storing either one or the other kinds of binary digit. The radiated signal is then detected by any suitable means and converted to an electrical signal.

Various modes of operating the memory to prevent undesired cumulative changes in the ferroelectric elements are described. In one mode alternating polarity excitations are applied to any one selecting line; in another mode pairs of alternating polarity excitations are applied with any one pair having the same polarity.

Various arrangements of the memory systems have been described to obtain a large storage capacity in a relatively small space. For example, single radiation detecting means may be used for an entire array by using an additional sheet of material for channeling radiation.

What is claimed is:

1. In a memory system, the combination of a ferroelectric element having two states of appreciable charge remanence, an electroluminescent element electrically connectd to said ferroelectric element, and means for applying first and second excitations to said ferroelectric element to successively change the charge therein back and forth between said remanent states, said changes of charge being successively transferred to and from said electroluminescent element, said electroluminescent element emitting a light pulse during the application of said second excitation and not emitting a light pulse during the application of said first excitation.

2. In a memory system, the combination as claimed in claim 1 including a light responsive means responsive to said light pulse.

3. In a memory system, the combination as claimed in claim 1 including a light conducting medium, and a light responsive means, said light conducting medium conducting said light pulse to said light responsive means.

4. A memory system comprising a plurality of ferroelectric storage elements arranged in a two dimensional array, said storage elements each having two remanent states, a sheet of electroluminescent material placed against said two dimensional array of storage elements and means electrically connecting different portions of said sheet to different said storage elements, means for applying first signals to said array elements for successively driving a desired one of said ferroelectric elements between said states, certain of said elements being partially driven by said first signals, the one portion of said electroluminescent sheet connected to said desired ferroelectric element emitting a light pulse in response to said change of state and means for applying second signals to said array elements for cancelling the effects of said first signals on said certain elements.

5. A memory system as claimed in claim 4 including a sheet of light conducting medium placed against said sheet of electroluminescent material, and a light responsive means optically coupled to said sheet of light conducting medium.

6. A memory system comprising a plurality of ferroelectric storage elements, a plurality of electroluminescent elements, each said ferroelectric element being electrically connected to a different said electroluminescent element, said ferroelectric elements each having first and second remanent states, means for applying signals to said ferroelectric elements for successively changing a desired one of said ferroelectric elements from said first to said second and from said second to said first of said remanent states, each said change producing a relatively large change of charge in said desired element, the connected one of said electroluminescent elements not emitting a light pulse when said ferroelectric element changes from said first to said second state and emitting a relatively intense light pulse when said ferroelectric element changes from said second to said first state, and sensing means responsive to said light pulse emitted by said one electroluminescent element.

7. In a memory system, the combination of a ferroelectric storage element having two remanent states and electrically coupled to an electroluminesecnt element with means for reading information stored in said storage element comprising means for applying first and second pulse excitations of respectively opposite polarities to said storage element, the charge of said storage element when storing one kind of binary digit being changed back and forth between said remanent states by said first and second excitations, said changed charge being transferred to and from said electroluminescent element, said electroluminescent element emitting a light pulse when said changed charge is being transferred from said electroluminescent element to said storage element, the charge of said storage element when storing the other kind of binary digit being changed only from one to the other of said states by said first and second excitations, and said changed charge being only transferred to said electroluminescent element, whereby no light pulse is emitted by said electroluminescent element.

8. In a memory system, the combination of a ferroelectric element connected electrically to an electroluminescent element, said ferroelectric element having two remanent states, means to apply to said ferroelectric element first and second excitations, said first excitation being in a direction to change said ferroelectric element from one to the other of said states, and said second excitation being in a direction to change said ferroelectric element from the said other to the said one state, said ferroelectric element causing first and second appreciable current flows through said electroluminescent element in successively changing between said two states, said electroluminescent element producing a light pulse when the second of said appreciable currents flows therein.

9. In a memory system, the combination as claimed in claim 8 including light responsive means optically coupled to said electroluminescent element.

10. A memory system comprising a sheet of ferroelectric material, a sheet of electroluminescent material in electrical contact with said ferroelectric material, a first set of selecting lines plated on the surface of said ferroelectric sheet remote from said electroluminescent sheet, a second set of selecting lines of transparent conducting material plated on the surface of said electroluminescent sheet remote from said ferroelectric sheet, said first set of selecting lines being located transverse to said second set of selecting lines, a plurality of ferroelectric storage elements, each different element being defined by the ferroelectric material of said sheet between a different selecting line of said first set and a different selecting line of said second set, said elements each having two remanent states for storing a binary digit, and means for reading information stored in a desired one of said elements comprising means for applying a first pair of first and second opposite polarity signals to the one selecting line of said first set and a second pair of third and fourth opposite polarity signals to the one selecting line of said second set, said one selecting lines defining said desired element, said first and third signals being of like polarity, said second and fourth signals being of a polarity opposite that of said first and third signals, and said first and second pairs being applied concurrently, said electroluminescent sheet emitting a signal during the application of said second and fourth selecting signals when said desired element is in one of said remanent states, and not emitting a signal when said desired element is in the other of said remanent states.

11. A memory system as claimed in claim 10 including means for writing information into said desired element comprising means for applying to said one selecting lines respectively fifth and sixth opposite polarity signals, said last mentioned signals being applied concurrently in writing one kind of binary digit and non-concurrently in writing the other kind of binary digit.

12. A memory system as claimed in claim 10 including a sheet of material in close proximity to said electroluminescent material and conductive to said emitted signal, and means coupled to said conductive sheet for changing said emitted signal to an electrical signal.

13. A memory system comprising a sheet of ferroelectric material characterized by having two remanent states, a sheet of electroluminescent material electriaclly coupled to said ferroelectric sheet, a set of row lines plated on said ferroelectric sheet, a set of column lines transverse to said row lines plated on said electroluminescent sheet, said row and column lines defining a plurality of ferroelectric-electroluminescent cell combinations for storing a plurality of binary information signals, means for applying a train of alternating polarity signals to a desired one row line and a train of alternating polarity signals to a desired one column line, each of said signals being insufficient in amplitude and a pair of said signals being sufficient in amplitude to change the ferroelectric material receiving said signals from one to the other of said states, certain of said row and column signals being coincident for reading out information stored in the one cell defined by said one row and column lines, any one of said certain row signals being of opposite polarity from its coincident column signal, another row and another column signal being coincident for writing one kind of binary signal into the said one cell, and the remaining row and column signals being staggered relative to each other.

14. In a memory system, the combination of rectangular hysteresis loop ferroelectric material, electroluminescent material deposited on one surface of said ferroelectric material, means for applying first and second excitations to said ferroelectric material to successively change the charge in a desired portion thereof, said changes of charge being successively transferred to and from said electroluminescent material, and said electroluminescent material radiating a signal only during the application of said second excitation.

15. In a memory system, the combination of an array of ferroelectric elements each having two states of appreciable charge remanence, said array having surfaces, electroluminescent material placed on one of said array surfaces, first and second sets of selecting lines electrically coupled to said ferroelectric elements for successively applying excitation signals to a desired one of said elements, said desired element in changing from one to the other of said states charging a portion of said electroluminescent material and said desired element in changing from said other to said one state discharging said portion of electroluminescent material, and said electroluminescent material radiating a signal upon discharge of said portion to indicate the initial state of said desired ferrolectric element.

16. In a memory system, the combination as claimed in claim 15 including means for applying successively a third excitation to said desired element to change said desired element from the said one to the said other state.

17. In a memory system, the combination as claimed in claim 16 including means for applying a plurality of charge excitations to said desired element after said third excitation is terminated, said plurality of excitations each being in a direction to change said desired element from said other towards the said one state.

18. In a memory system, the combination as claimed in claim 15 including means for applying a plurality of partial excitations each in a direction to change said desired element to said one state and means for applying successively a third excitation to said desired element to change said desired element from said other to the one of said states whereby binary information is written into said desired element.

References Cited in the file of this patent

UNITED STATES PATENTS

| | | |
|---|---|---|
| 2,691,738 | Matthias | Oct. 12, 1954 |
| 2,695,396 | Anderson | Nov. 23, 1954 |
| 2,698,915 | Piper | Jan. 4, 1955 |
| 2,717,373 | Anderson | Sept. 6, 1955 |
| 2,796,584 | Hurvitz | June 18, 1957 |
| 2,816,236 | Rosen | Dec. 10, 1957 |
| 2,833,936 | Ress | May 6, 1958 |
| 2,873,380 | Kazan | Feb. 10, 1959 |
| 2,875,380 | Toulon | Feb. 24, 1959 |

FOREIGN PATENTS

| | | |
|---|---|---|
| 204,854 | Australia | Dec. 13, 1956 |

OTHER REFERENCES

"Elf: A New Electroluminescent Display" (Sack), Proceedings of the I.R.E., October 1958, pp. 1694–1699.